United States Patent [19]
Hemmings

[11] 3,826,166
[45] July 30, 1974

[54] TIRE SHREDDING MACHINE

[76] Inventor: Norman Hemmings, Compton Abbas, Shaftesbury, Dorset, England

[22] Filed: Oct. 25, 1972

[21] Appl. No.: 300,802

[30] Foreign Application Priority Data
Oct. 27, 1971  Great Britain ..................... 50023/71
Mar. 17, 1972  Great Britain ..................... 12601/72
July 14, 1972  Great Britain ..................... 33002/72

[52] U.S. Cl. ..................... 83/132, 83/135, 83/136, 83/620
[51] Int. Cl. ..................... B26d 7/18, B29h 19/00
[58] Field of Search ............. 83/132, 136, 598, 599, 83/600, 620, 135, 613, 618, 639

[56] References Cited
UNITED STATES PATENTS
1,076,384  10/1913  Mighirian .............................. 83/620

Primary Examiner—Donald R. Schran
Attorney, Agent, or Firm—Richard Wiener

[57] ABSTRACT

A tire shredding machine comprises a pair of relatively reciprocable platens formed with complimentary sets of guillotine-type blades. An hydraulic ram is provided for operating the platens and the machine has an ejector mechanism for expelling shred material from between the blades.

3 Claims, 2 Drawing Figures

TIRE SHREDDING MACHINE

This invention relates to shredding machines particularly for use in shredding vehicle tires.

The disposal of used vehicle tires presents a problem because tires do not readily decompose and because of their resilient and bulky nature they cannot be used as land fill material. Accordingly there has been a long felt want for an efficient, relatively simple and light weight tire demolishing machine.

The present invention provides a shredding machine particularly for shredding vehicle tires comprising a pair of relative reciprocable platens capable of receiving a vehicle tire therebetween, the platens being provided with complimentary sets of guillotine-type blades, and hydraulic ram means for closing the platens on one another to slit an article positioned between the platens into segments by inter-operation of the blades of the respective platens.

In a preferred form of the invention the machine is provided with an ejector mechanism for removing tire material from between the platen blades, said mechanism comprising bars fitting between the blades of each platen, and bars associated with one platen being fixed in position with respect to the bars associated with the other platen in the opening and closing direction of the platens to provide relative movement between the platens and their respective sets of bars during opening and closing of the platens.

The invention will now be described by way of an example with reference to the accompanying drawings in which.

Figure 1:
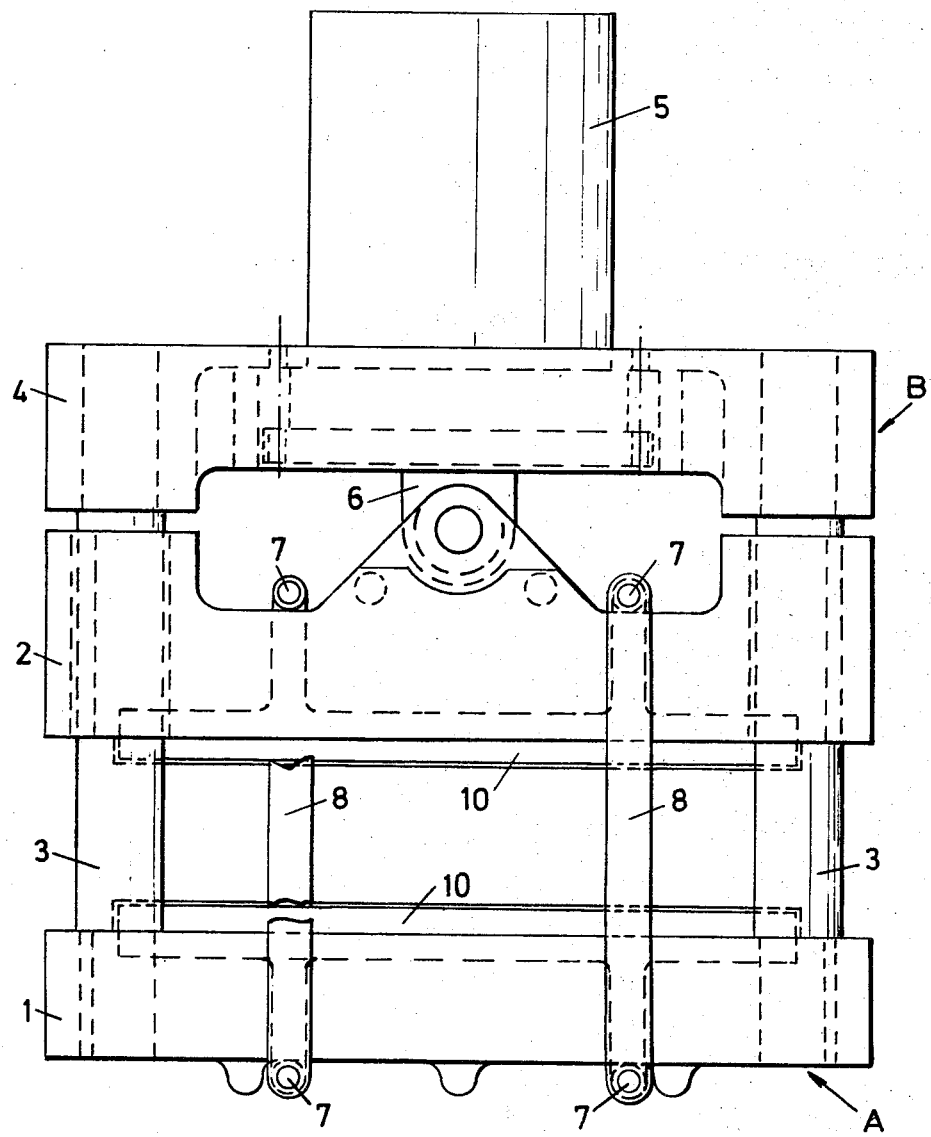
FIG. 1 is a vertical elevation of a tire shredding machine.
Figure 2:
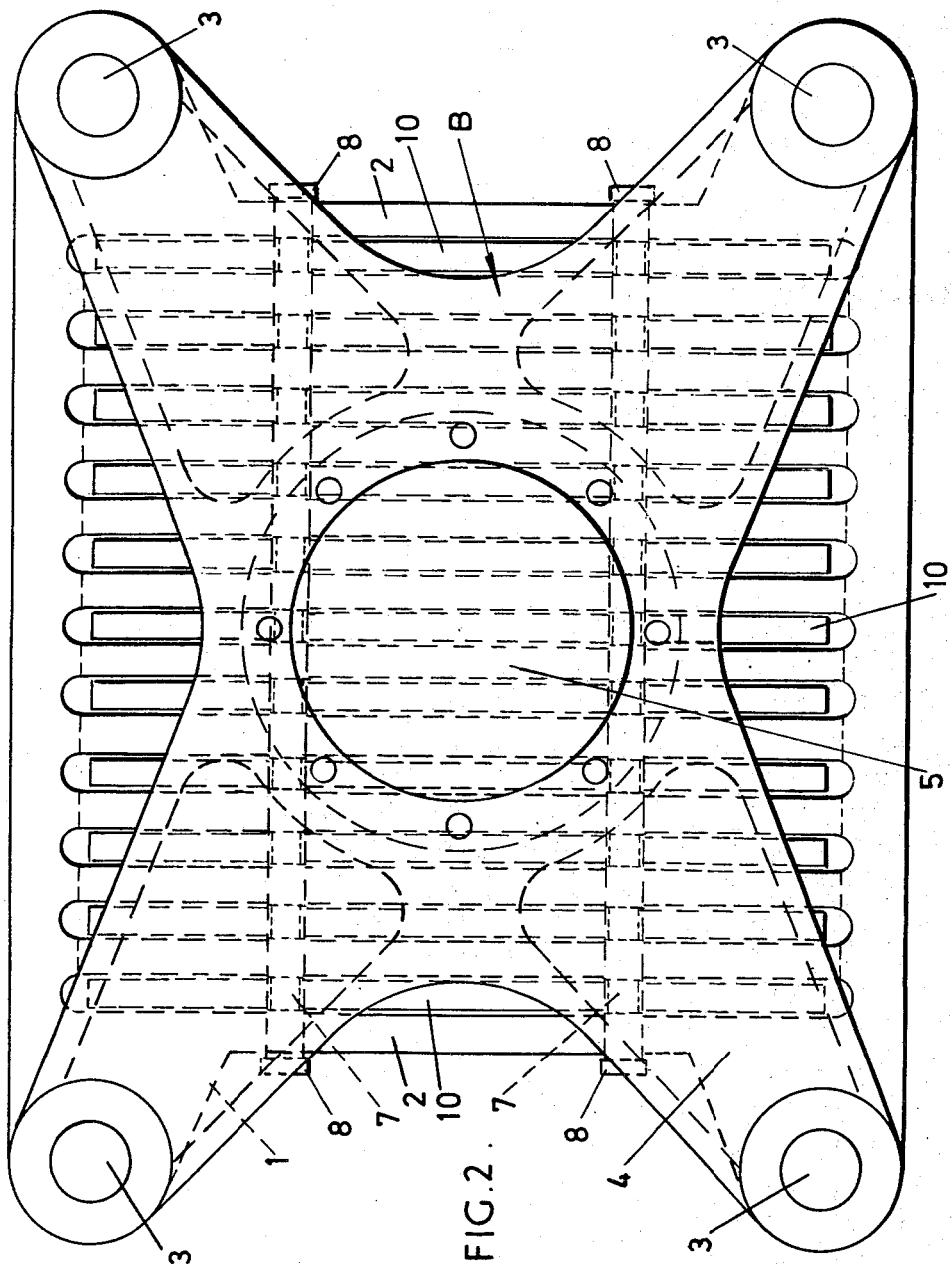
FIG. 2 is a plan view of the machine.

The machine comprises a lower platen A and an upper platen B each provided with complimentary sets of guillotine blades 1 and 2 respectively and the upper platen being guided on pillars 3. The pillars carry an upper frame 4 on which is mounted an hydraulic ram assembly 5, the piston rod 6 of the ram being connected to the upper platen B. For tire shredding purposes, the ram should be capable of exerting a pressure of about 3,200 pounds per square-inch.

An ejector assembly is provided comprising a series of bars 10 positioned between the blades of each platen, the bars being interconnected by cross ties 7 and vertical ties 8 to provide a floating type assembly in which the bars of one platen are a fixed distance from the bars of the other platen which allows for relative movement between the bars and their associated platens when the latter are opened and closed. The spacing between the respective sets of bar is such that in the open position of the machine, the bars are substantially flush with the blades as shown in FIG. 1.

In operation, a tire is placed on the bottom platen and the ram is operated to close the machine. The tire is slit into segments by the guillotine type action of the blades and when the machine is opened, ejection of the segments is accomplished through relative movement between the bars and platens due to the floating nature of the ejector assembly.

The machine can be made from alloy steel castings rendering the machine sufficiently light in weight to be portable, so that it can be used for example on a tow-truck.

It is envisaged that the machine may also be useful for shredding articles other than vehicle tires.

I claim:

1. A shredding machine particularly for shredding vehicle tires comprising a pair of relatively reciprocable platens capable of receiving a vehicle tire therebetween, the platens being provided with complimentary sets of guillotine-type blades, and hydraulic rams means for closing the platens on one another to slit an article positioned between the platens into segments by inter-operation of the blades of the respective platens.

2. A machine as claimed in claim 1 including an ejector mechanism for removing material from between the blades of each platen after a shredding operation.

3. A machine as claimed in claim 2 wherein the ejector mechanism comprises bars fitting between the blades of each platen, the bars associated with one platen being fixed in position with respect to the bars associated with the other platen in the opening and closing direction of the platens to provide relative movement between the platens and their respective sets of bars during opening and closing of the platens.

* * * * *